US012593265B2

(12) United States Patent
Huang

(10) Patent No.: US 12,593,265 B2
(45) Date of Patent: Mar. 31, 2026

(54) NETWORK CONFIGURATION METHOD, ELECTRONIC DEVICE, AND COMPUTER-READABLE STORAGE MEDIUM

(71) Applicant: Beijing Pantum Information Technology Ltd., Beijing (CN)

(72) Inventor: Yu Huang, Beijing (CN)

(73) Assignee: Beijing Pantum Information Technology Ltd., Beijing (CN)

( * ) Notice: Subject to any disclaimer, the term of this patent is extended or adjusted under 35 U.S.C. 154(b) by 350 days.

(21) Appl. No.: 18/330,713

(22) Filed: Jun. 7, 2023

(65) Prior Publication Data

US 2023/0413163 A1 Dec. 21, 2023

(30) Foreign Application Priority Data

Jun. 17, 2022 (CN) .......................... 202210690461.0

(51) Int. Cl.
*H04W 48/10* (2009.01)
*H04W 48/16* (2009.01)

(52) U.S. Cl.
CPC ........... *H04W 48/10* (2013.01); *H04W 48/16* (2013.01)

(58) Field of Classification Search
CPC .............. H04L 1/0061; H04L 41/0806; H04L 41/0869; H04W 28/04; H04W 48/10; H04W 48/16
See application file for complete search history.

(56) References Cited

U.S. PATENT DOCUMENTS

| | | | |
|---|---|---|---|
| 10,243,974 B2 * | 3/2019 | Manjunath | .......... H04L 63/1416 |
| 10,390,070 B2 * | 8/2019 | Kolekar | ............. H04N 21/2662 |
| 10,440,122 B2 * | 10/2019 | Brickell | .................. H04L 67/10 |
| 10,785,098 B1 | 9/2020 | Jiang et al. | |
| 10,938,855 B1 * | 3/2021 | Waldie | .................. G06F 21/575 |
| 11,405,273 B1 * | 8/2022 | Chen | ................... H04L 41/0886 |
| 2003/0115362 A1 | 6/2003 | Tarvainen et al. | |
| 2005/0099977 A1 * | 5/2005 | Williams | ................ H04L 47/20 370/338 |
| 2006/0007944 A1 * | 1/2006 | Movassaghi | ........ H04L 41/0813 370/401 |

(Continued)

FOREIGN PATENT DOCUMENTS

| | | | | |
|---|---|---|---|---|
| CN | 101436922 A | 5/2009 | | |
| CN | 103416086 B | * 12/2016 | ............ | H04W 24/02 |

(Continued)

OTHER PUBLICATIONS

The Patent Office of the Russian Federation The Official Action for 2023115864 Feb. 13, 2024 15 Pages.

*Primary Examiner* — Wutchung Chu

(74) *Attorney, Agent, or Firm* — Anova Law Group, PLLC

(57) ABSTRACT

The present disclosure provides a network configuration method, an electronic device and a computer-readable storage medium. The method includes broadcasting a network configuration data request; monitoring network configuration data broadcasted by a main control device in response to the network configuration data request; and performing network configuration according to the network configuration data and broadcasting first indication information, where the first indication information is configured to indicate the network configuration is completed.

20 Claims, 5 Drawing Sheets

(56) References Cited

U.S. PATENT DOCUMENTS

| | | | | |
|---|---|---|---|---|
| 2006/0031427 A1* | 2/2006 | Jain | H04L 67/125 | 709/220 |
| 2007/0250614 A1* | 10/2007 | Szabo | H04W 8/24 | 709/223 |
| 2009/0190154 A1* | 7/2009 | Noguchi | G06F 3/1288 | 358/1.13 |
| 2014/0036670 A1* | 2/2014 | Li | H04W 48/18 | 370/230 |
| 2014/0269442 A1* | 9/2014 | Hyde | H04W 12/08 | 370/259 |
| 2016/0119859 A1 | 4/2016 | Liu | | |
| 2016/0219475 A1* | 7/2016 | Kim | H04W 76/19 | |
| 2017/0026490 A1* | 1/2017 | Lee | H04L 67/63 | |
| 2017/0244732 A1* | 8/2017 | Manjunath | H04L 63/1416 | |
| 2018/0288458 A1* | 10/2018 | Kolekar | H04W 4/08 | |
| 2019/0223230 A1* | 7/2019 | Zhang | H04W 76/10 | |
| 2019/0280918 A1* | 9/2019 | Hermoni | G06F 18/214 | |
| 2020/0028879 A1* | 1/2020 | Lahiri | H04L 63/10 | |
| 2020/0159981 A1* | 5/2020 | DiCorpo | G06F 30/39 | |
| 2020/0192613 A1* | 6/2020 | Brady | G06F 3/1232 | |
| 2021/0029563 A1* | 1/2021 | Hong | H04W 24/08 | |
| 2021/0153104 A1 | 5/2021 | Wang et al. | | |
| 2021/0211423 A1* | 7/2021 | Tan | H04W 12/71 | |
| 2021/0400502 A1 | 12/2021 | Zhang et al. | | |
| 2022/0021578 A1* | 1/2022 | Lu | G06F 3/0482 | |
| 2023/0216732 A1* | 7/2023 | Liu | H04L 67/146 | 709/220 |
| 2023/0370334 A1* | 11/2023 | Mannengal | H04L 43/04 | |
| 2023/0370452 A1* | 11/2023 | Mannengal | H04L 41/12 | |
| 2023/0410272 A1* | 12/2023 | Goyal | G06T 7/0002 | |

FOREIGN PATENT DOCUMENTS

| | | | | |
|---|---|---|---|---|
| CN | 106535005 A | 3/2017 | | |
| CN | 113055867 A | 6/2021 | | |
| CN | 113316147 A | 8/2021 | | |
| CN | 114202947 A | 3/2022 | | |
| CN | 114286338 A | 4/2022 | | |
| EP | 3657326 A1 | 5/2020 | | |
| EP | 3764697 A1 * | 1/2021 | | H04W 8/005 |
| EP | 3873053 A1 * | 9/2021 | | H04W 48/16 |
| RU | 2397613 C2 | 8/2010 | | |
| RU | 2412549 C1 | 2/2011 | | |
| WO | 2022016670 A1 | 1/2022 | | |

* cited by examiner

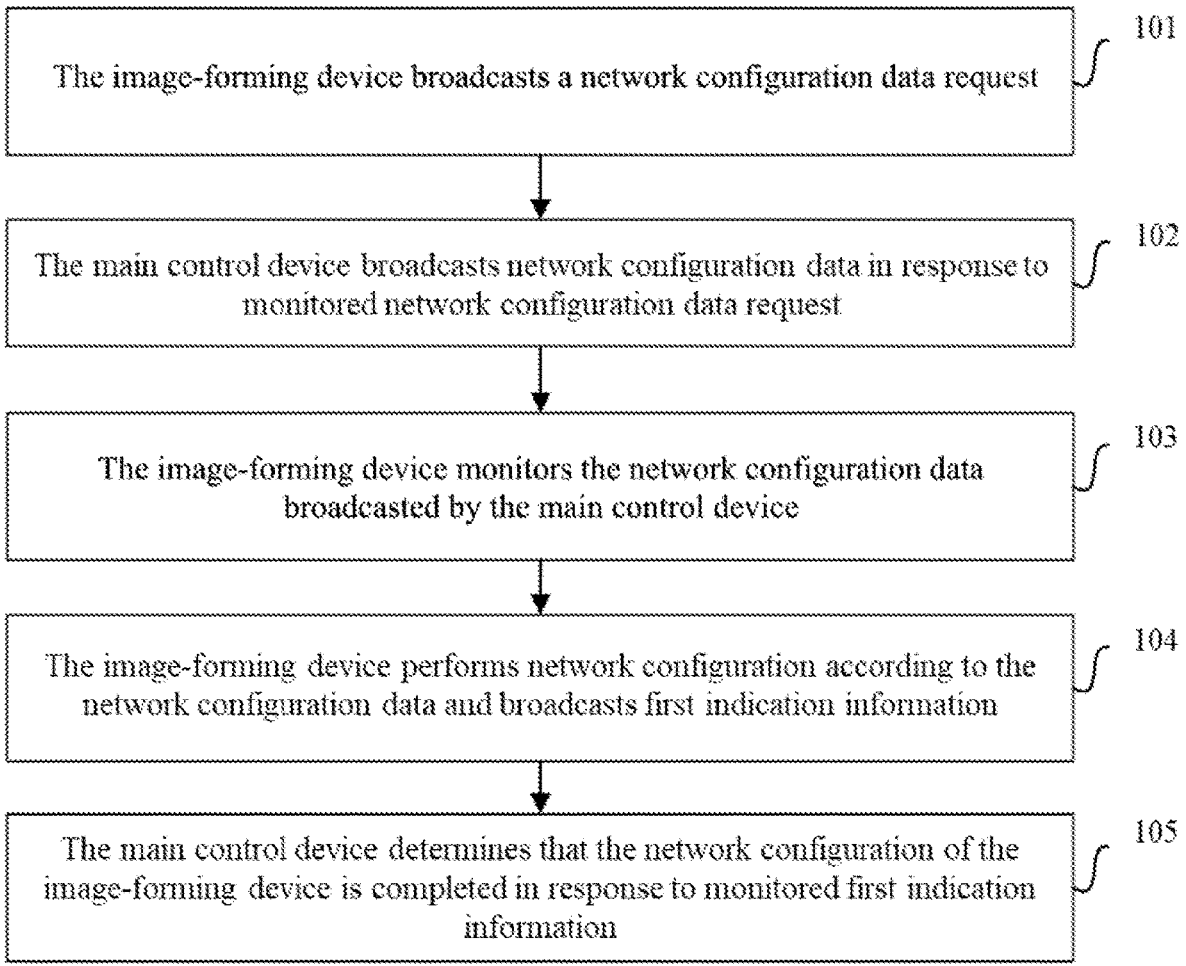

The image-forming device broadcasts a network configuration data request    101

The main control device broadcasts network configuration data in response to monitored network configuration data request    102

The image-forming device monitors the network configuration data broadcasted by the main control device    103

The image-forming device performs network configuration according to the network configuration data and broadcasts first indication information    104

The main control device determines that the network configuration of the image-forming device is completed in response to monitored first indication information    105

FIG. 1

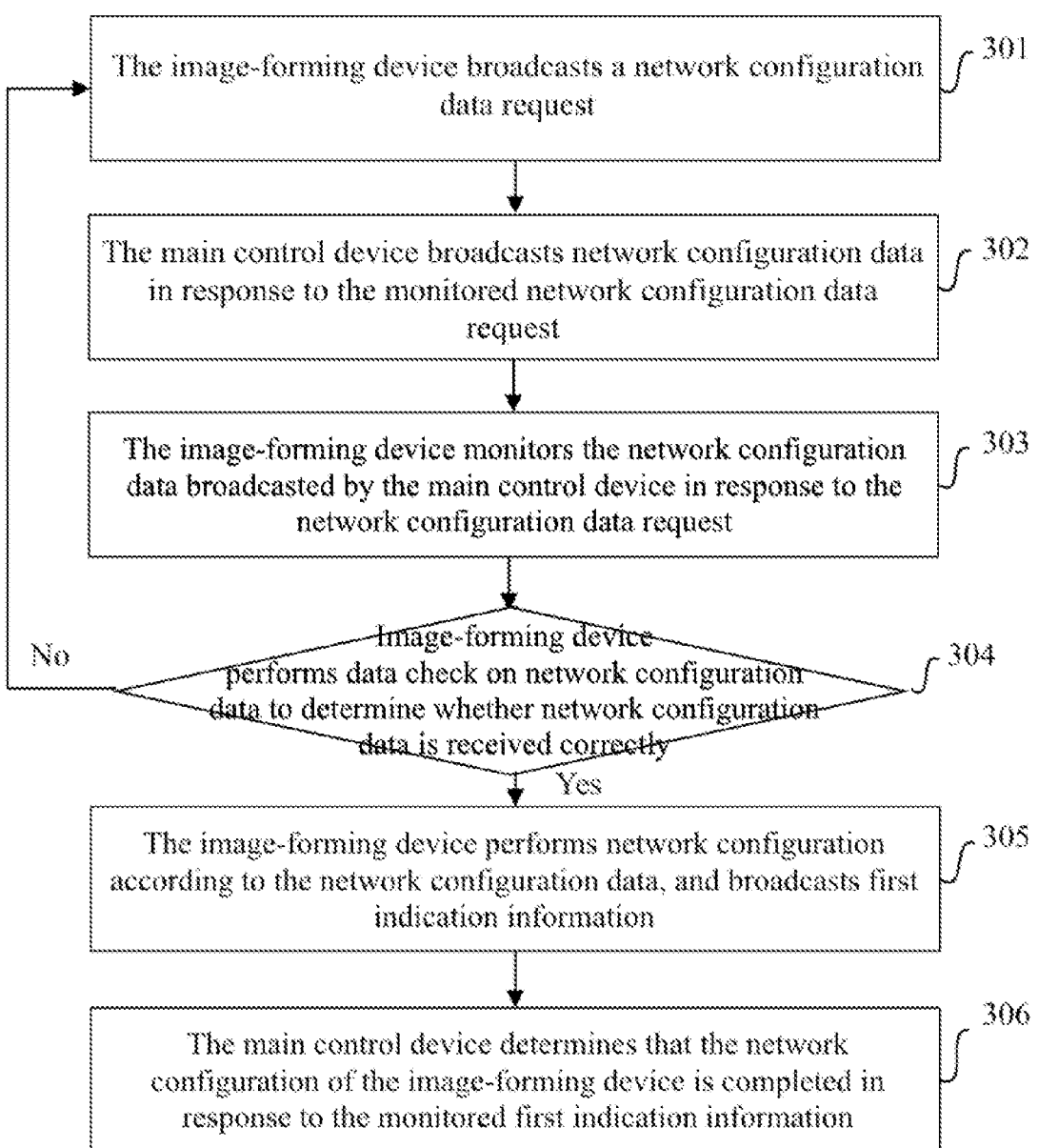

The image-forming device broadcasts a network configuration data request — 301

The main control device broadcasts network configuration data in response to the monitored network configuration data request — 302

The image-forming device monitors the network configuration data broadcasted by the main control device in response to the network configuration data request — 303

Image-forming device performs data check on network configuration data to determine whether network configuration data is received correctly — 304

No

Yes

The image-forming device performs network configuration according to the network configuration data, and broadcasts first indication information — 305

The main control device determines that the network configuration of the image-forming device is completed in response to the monitored first indication information — 306

FIG. 3

NETWORK CONFIGURATION METHOD, ELECTRONIC DEVICE, AND COMPUTER-READABLE STORAGE MEDIUM

CROSS-REFERENCE TO RELATED APPLICATION

The present disclosure claims the priority to Chinese patent application No. 202210690461.0, filed on Jun. 17, 2022, in the China National Intellectual Property Administration, the entirety of all of which is incorporated herein by reference.

TECHNICAL FIELD

The present disclosure generally relates to the field of communication technology and, more particularly, relates to a network configuration method, an electronic device, and a computer-readable storage medium.

BACKGROUND

With continuous development of Internet of Things (IoT) technology, various image-forming devices such as printers, copies, scanners and the like are connected to the wireless network for use. At present, when configuring a wireless network for the image-forming device, one common method is that network configuration information may be broadcasted by a main control device (such as a PC terminal, a mobile terminal, or the like); and after monitoring the network configuration information, the image-forming device may configure the network according to the network configuration information.

However, when the network configuration is performed through above-mentioned method, on the one hand, the main control device cannot confirm whether the image-forming device receives above configuration information and also cannot determine whether the image-forming device has completed network configuration, which may have low reliability; on the other hand, the image-forming device cannot control sending time of the network configuration information, which may have insufficient flexibility.

SUMMARY

One aspect of the present disclosure provides a network configuration method, applied to an image-forming device. The method includes broadcasting a network configuration data request; monitoring network configuration data broadcasted by a main control device in response to the network configuration data request; and performing network configuration according to the network configuration data and broadcasting first indication information, where the first indication information is configured to indicate the network configuration is completed.

Another aspect of the present disclosure provides a network configuration method, applied to a main control device. The method includes in response to a monitored network configuration data request, broadcasting network configuration data; and in response to monitored first indication information, determining that network configuration of an image-forming device is completed.

Another aspect of the present disclosure provides a network configuration apparatus. The network configuration apparatus includes a first broadcast module configured to broadcast the network configuration data request, a first monitoring module configured to monitor the network configuration data broadcasted by the main control device in response to the network configuration data request, and a network configuration module configured to perform the network configuration according to the network configuration data and broadcast the first indication information, where the first indication information may be configured to indicate that the network configuration is completed.

Another aspect of the present disclosure provides a network configuration apparatus. The network configuration apparatus includes a second broadcast module configured to broadcast the network configuration data in response to monitored network configuration data request, and a second determination module configured to determine that the network configuration of the image-forming device is completed in response to monitored first indication information.

Another aspect of the present disclosure provides an electronic device. The electronic device includes at least one processor; and at least one memory communicatively coupled to the at least one processor, where the at least one memory stores program instructions executable by the at least one processor, and the at least one processor calls the program instructions to execute a network configuration method. The method includes broadcasting a network configuration data request; monitoring network configuration data broadcasted by a main control device in response to the network configuration data request; and performing network configuration according to the network configuration data and broadcasting first indication information, where the first indication information is configured to indicate the network configuration is completed.

Another aspect of the present disclosure provides an electronic device. The electronic device includes at least one processor; and at least one memory communicatively coupled to the at least one processor, where the at least one memory stores program instructions executable by the at least one processor, and the at least one processor calls the program instructions to execute above-mentioned method.

Another aspect of the present disclosure provides a non-transitory computer-readable storage medium including computer instructions which, when being executed, causes a computer to execute a network configuration method. The method includes broadcasting a network configuration data request; monitoring network configuration data broadcasted by a main control device in response to the network configuration data request; and performing network configuration according to the network configuration data and broadcasting first indication information, where the first indication information is configured to indicate the network configuration is completed.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in following description are merely some embodiments of the present disclosure. For those skilled in the art, other drawings may be obtained in accordance with these drawings without creative efforts.

FIG. 1 illustrates a flow chart of a network configuration method according to exemplary embodiments of the present disclosure.

FIG. 3 illustrates another flow chart of a network configuration method according to exemplary embodiments of the present disclosure.

DETAILED DESCRIPTION

Figure 2:
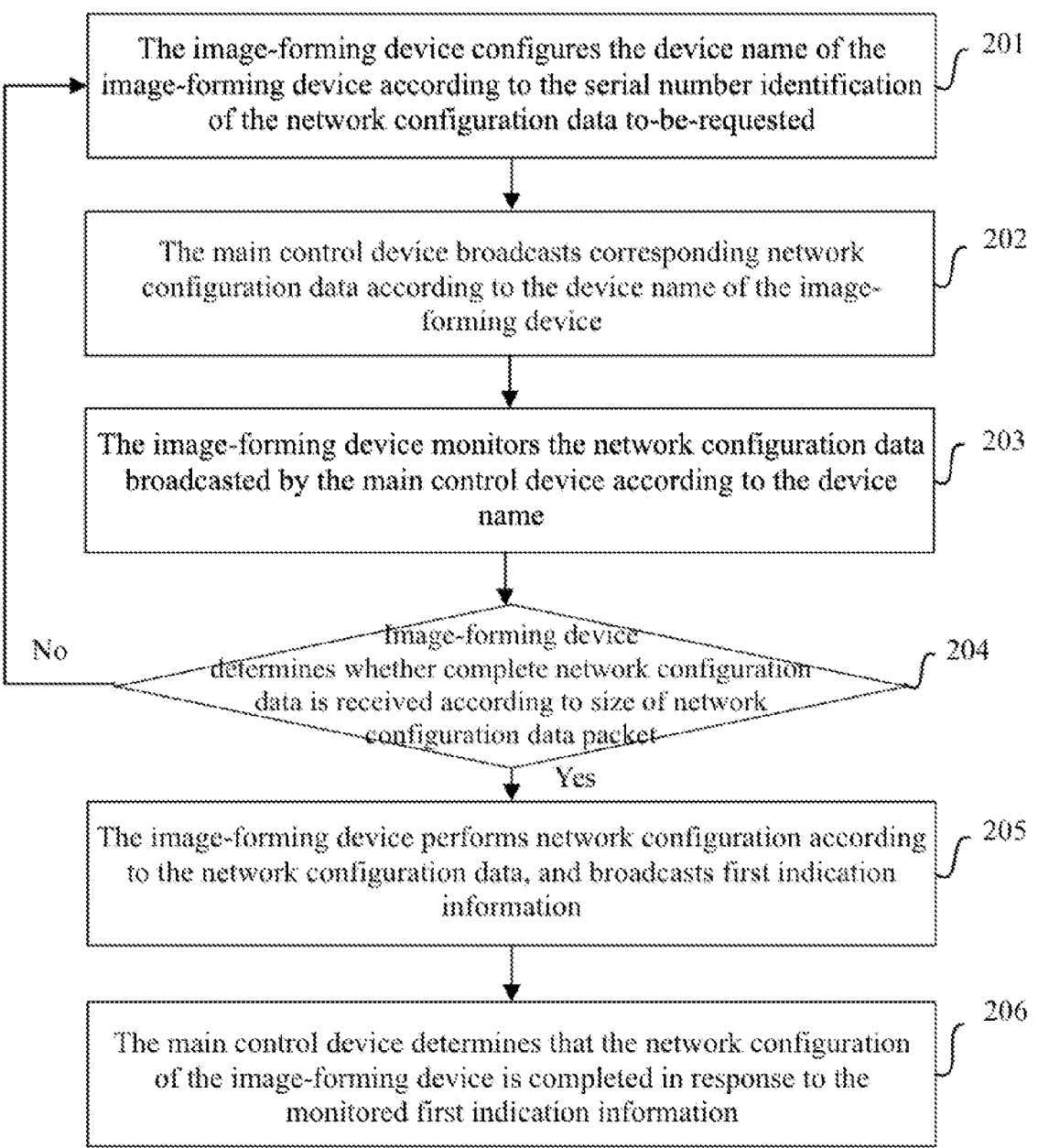
FIG. 2 illustrates another flow chart of a network configuration method according to exemplary embodiments of the present disclosure.

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

Terms used in embodiments of the present disclosure are only for the purpose of describing specific embodiments and are not intended to limit the present disclosure. Singular forms "a", "said", "first" and "the" used in embodiments of the present disclosure and appended claims are also intended to include plural forms unless the context clearly indicates otherwise.

In the present disclosure, the main control device maybe a network configuration device, and the image-forming device may be a device to-be-configured. The main control device may be configured to send data related to network configuration to the image-forming device, such that the image-forming device may complete network configuration, thereby being connected to a local area network.

The main control device may be, for example, any terminal device such as a personal computer (PC), a personal digital assistant (PDA), a wireless handheld device, a tablet computer, a mobile phone and the like, which may not be limited in the present disclosure.

FIG. 1 illustrates a flow chart of a network configuration method according to exemplary embodiments of the present disclosure. Referring to FIG. 1, above-mentioned network configuration method may include following exemplary steps.

At 101, the image-forming device may broadcast a network configuration data request.

After being powered on, the image-forming device may enter a network configuration mode in response to a received mode configuration operation. Exemplarily, the mode configuration operation may be a press operation of pressing one or more specified keys on the image-forming device, a click operation of a specified button in a display interface, and/or the like. The network configuration mode may be, for example, a Bluetooth mode or a wireless access point (AP) mode.

After entering the network configuration mode, the image-forming device may automatically broadcast the network configuration data request to request the main control device to broadcast network configuration data.

In an optional implementation manner, the image-forming device may add the network configuration data request to the device name of the image-forming device. Therefore, after the main control device discovers the image-forming device by search, the main control device may respond to the network configuration data request according to the device name. The form of the network configuration data request may be determined by the agreement between the image-forming device and the main control device, for example, may be PW_Req or the like, which may not be limited in the present disclosure.

At 102, the main control device may broadcast the network configuration data in response to monitored network configuration data request.

After the network configuration program in the main control device is started, the main control device may search for image-forming devices currently in the network configuration mode. After a corresponding image-forming device is discovered by search, the main control device may determine that the image-forming device is requesting the network configuration data according to the device name of the image-forming device. Furthermore, the main control device may broadcast the network configuration data in response to the network configuration data request. For example, the main control device may encapsulate the network configuration data in a network configuration data packet for broadcasting.

At 103, the image-forming device may monitor the network configuration data broadcasted by the main control device.

At 104, the image-forming device may perform network configuration according to the network configuration data and broadcast first indication information.

After the image-forming device logs into the local area network according to the network configuration data, the device name may be configured according to the first indication information. In embodiments of the present disclosure, the first indication information may be configured to indicate that the network configuration is completed. The form of the first indication information may be determined by the agreement between the image-forming device and the main control device, for example, may be COMPLETE. In an exemplary implementation manner, configuring the device name by the image-forming device according to the first indication information may be configuring the device name as PW_COMPLETE.

At 105, the main control device may determine that the network configuration of the image-forming device is completed in response to monitored first indication information.

In embodiments of the present disclosure, after the main control device discovers the image-forming device by search, the main control device may determine the first indication information according to the device name of the image-forming device and may then determine that the network configuration of the image-forming device is completed according to the first indication information.

Through above-mentioned technical solution, the main control device may obtain the network configuration progress of the image-forming device in time, which may improve the reliability of the network configuration process; and the image-forming device may actively control sending time of network configuration information, which may improve the flexibility of the network configuration process.

In another embodiment of the present disclosure, an implementation manner of above-mentioned network configuration method is further described.

In embodiments of the present disclosure, in order to improve data transmission efficiency, a transmission threshold may be preset between the main control device and the image-forming device according to a protocol. The transmission threshold may be configured to specify the maximum data amount of each transmission between the main control device and the image-forming device. The value of the transmission threshold may be set according to requirements, for example, may be configured as the maximum transmission threshold allowed during broadcasting.

As disclosed above, the main control device may split complete network configuration data according to the preset transmission threshold to obtain multiple network configuration data. Then, the main control device may assign a corresponding serial number identification to each network configuration data obtained by splitting according to a preset numbering rule. The serial number identification may be any identification defined by protocol that can characterize the sequence, for example, may be a number, a letter, a combination of a number and a letter, and/or the like.

In particular, when the data volume of complete network configuration data is less than the preset transmission threshold, the number of network configuration data obtained by splitting may be 1 (that is, no splitting may be required). At this point, the main control device may assign a serial number, which indicates sequence 1, to complete network configuration data according to the preset numbering rule.

Based on the splitting principle and numbering principle of complete network configuration data by above-mentioned main control device, as shown in FIG. 2, above-mentioned network configuration method may include following exemplary steps in embodiments of the present disclosure.

At 201, the image-forming device may configure the device name of the image-forming device according to the serial number identification of the network configuration data to-be-requested.

In embodiments of the present disclosure, the device name configured by the image-forming device may include not only the network configuration data request, but also the serial number identification of the network configuration data to-be-requested. For example, the image-forming device does not know the number of obtained network configuration data split by the main control device at this point, such that in an optional implementation manner, the image-forming device may sequentially add corresponding serial number identification to the device names of the image-forming device according to encoding sequence.

For example, when requesting the network configuration data for the first time, the image-forming device may configure the device name of the image-forming device as PW_Req_001, where PW_Req may denote the network configuration data request, and 001 may denote a request for the first network configuration data. It should be noted that at this point, one or multiple split network configuration data may be obtained by the image-forming device.

At 202, the main control device may broadcast corresponding network configuration data according to the device name of the image-forming device.

The main control device may determine the serial number identification of the network configuration data to-be-requested according to the device name of the image-forming device. Furthermore, the main control device may broadcast corresponding network configuration data according to the serial number identification of the network configuration data. For example, the network configuration data may be a broadcast response network configuration data packet, and corresponding network configuration data may be encapsulated in the network configuration data packet.

In embodiments of the present disclosure, furthermore, in order to identify the service type corresponding to the data packet, the network configuration service identification may be also added to the packet header of above network configuration data packet. Exemplarily, the network configuration service identification may be, for example, PW_RESPONSE, which may be configured to indicate network configuration data response. In addition, above-mentioned network configuration data packet may also include the serial number identification of the network configuration data.

At 203, the image-forming device may monitor the network configuration data broadcasted by the main control device according to the device name.

At 204, the image-forming device may determine whether complete network configuration data has been received according to the size of the network configuration data packet. If complete network configuration data has been received, execute 205; otherwise, execute 201.

In embodiments of the present disclosure, complete network configuration data may be split into multiple network configuration data, such that it may determine whether complete network configuration data has been received currently after the image-forming device monitors the network configuration data broadcasted by the main control device each time.

It should be understood that under the premise of splitting complete network configuration data according to the preset transmission threshold, the scenario of the data volume included in each network configuration data packet obtained by splitting in most cases may be that the data volume of last network configuration data packet obtained by splitting may be less than the preset transmission threshold, and the data volumes of remaining network configuration data packets may be equal to the preset transmission threshold.

Therefore, on such basis, in an optional implementation manner, the image-forming device may determine the data volume of the network configuration data packet received this time. If the data volume is less than the preset transmission threshold, it may determine that currently received network configuration data packet is the last data packet, that is, complete network configuration data has been received; otherwise, it may determine that partial network configuration data has still not been received.

In another optional implementation manner, when the last network configuration data packet is broadcasted, the main control device may add the preset identification in the last network configuration data packet to label current network configuration data packet as the last data packet. The form of the preset identification may be determined by the agreement between the image-forming device and the main control device, for example, may be FINALLY. Each time receiving the network configuration data packet, the image-forming device may determine whether the network configuration data packet includes above-mentioned preset identification. If the network configuration data packet includes the preset identification, it may determine that complete network configuration data has been received. Otherwise, it may determine that partial network configuration data has still not been received.

On the basis of determining that complete network configuration data has been received, the image-forming device may continue to execute subsequent processes of the method. On the contrary, when the data volume of the network configuration data packet is equal to the preset transmission threshold, the image-forming device may have not received complete network configuration data; at this point, the image-forming device may re-execute above 201; and the device name may be re-configured according to the serial number identification of next network configuration data to-be-requested, such as PW_Req 002. Furthermore, next network configuration data packet broadcasted by the main control device may continue to be monitored. Such process may be repeated until the image-forming device determines that complete network configuration data has been received.

At 205, the image-forming device may perform network configuration according to the network configuration data and broadcast the first indication information.

At 206, the main control device may determine that the network configuration of the image-forming device is completed in response to monitored first indication information.

In above technical solution, the main control device may broadcast complete network configuration data after splitting to improve data transmission efficiency. The image-forming device may determine completeness of received network configuration data and re-broadcast the network configuration data request when it determines that complete network configuration data has not been received. Correspondingly, when it determines that complete network configuration data has been received, the network configuration may be implemented. In the scenario of broadcasting the network configuration data, the flexibility of data broadcasting may be improved.

FIG. 3 illustrates another flow chart of a network configuration method according to exemplary embodiments of the present disclosure. Referring to FIG. 3, the network configuration method provided in embodiments of the present disclosure may include following exemplary processes.

At 301, the image-forming device may broadcast the network configuration data request.

At 302, the main control device may broadcast the network configuration data in response to monitored network configuration data request.

In embodiments of the present disclosure, in response to the network configuration data request, the main control device may use a preset check rule to check the network configuration data and generate check information. The preset check rule may be any of, for example, cyclic redundancy check rule and the like. Then, the main control device may encapsulate both the check information and the network configuration data into the network configuration data packet and broadcast the network configuration data packet.

At 303, the image-forming device may monitor the network configuration data broadcasted by the main control device in response to the network configuration data request.

At 304, the image-forming device may perform data check on the network configuration data to determine whether the network configuration data is received correctly. If the network configuration data is received correctly, execute 305; otherwise, execute 301.

In embodiments of the present disclosure, the image-forming device may check received network configuration data to check whether received network configuration data is correct.

In an optional implementation manner, after receiving the network configuration data packet broadcasted by the main control device, the image-forming device may extract the network configuration data and the check information included therein. Then, the image-forming device may re-check the network configuration data according to above-mentioned preset check rule, such as a cyclic redundancy check rule, to obtain a check value. Next, the image-forming device may compare obtained check value with the check information in the network configuration data packet. If the comparison result is that the check value is consistent with the check information, it may determine that the check is passed, and the network configuration data is received correctly. Otherwise, if the check value is not consistent with the check information included in the network configuration data packet, it may determine that the check fails, and the network configuration data is received incorrectly.

In another optional implementation, for the network configuration scenario in Bluetooth mode, the image-forming device may simultaneously monitor the network configuration data broadcasted by the main control device from multiple broadcast channels; furthermore, the network configuration data monitored by all broadcast channels may be compared. If the network configuration data monitored by all broadcast channels are consistent with each other, or if the network configuration data monitored by any two broadcast channels are consistent with each other, it may determine that the network configuration data is received correctly. Otherwise, if the network configuration data monitored by all broadcast channels are not consistent with each other, it may determine that the network configuration data is received incorrectly.

When it determines that the network configuration data is received correctly, the image-forming device may continue to perform subsequent processes. However, when the network configuration data is received incorrectly, the image-forming device may re-execute above 301 to request the main control device to re-broadcast the network configuration data. For example, the image-forming device may keep current device name unchanged, and furthermore when the main control device discovers the device name again by search, the main control device may broadcast corresponding network configuration data again.

At 305, the image-forming device may perform the network configuration according to the network configuration data and broadcast the first indication information.

At 306, the main control device may determine that the network configuration of the image-forming device is completed in response to monitored first indication information.

In above technical solution, the image-forming device may check received network configuration data to ensure the correctness of received network configuration data. Moreover, the image-forming device may also implement data re-transmission when the check fails. Through above technical solution, the reliability of the network configuration process may be further improved.

Figure 4:
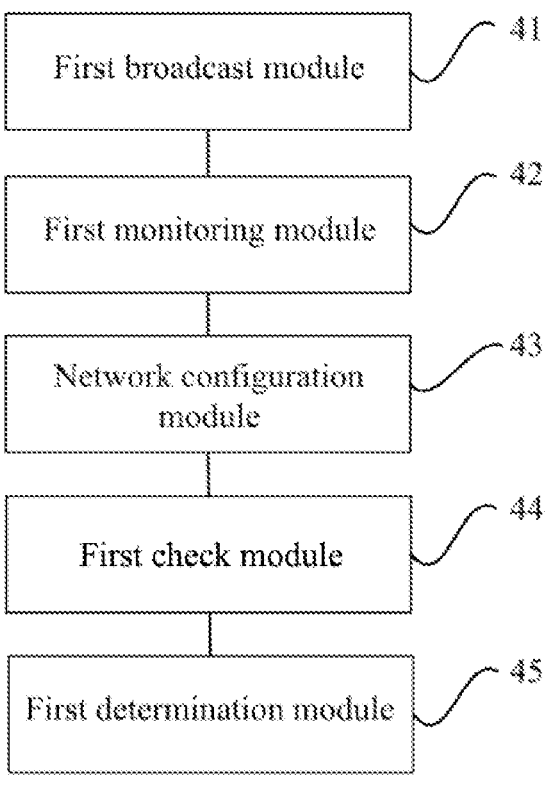
FIG. 4 illustrates a structural schematic of a network configuration apparatus according to exemplary embodiments of the present disclosure.

FIG. 4 illustrates a structural schematic of a network configuration apparatus according to exemplary embodiments of the present disclosure. Referring to FIG. 4, above-mentioned network configuration apparatus may include a first broadcast module 41, a first monitoring module 42, and a network configuration module 43.

The first broadcast module 41 may be configured to broadcast the network configuration data request.

The first monitoring module 42 may be configured to monitor the network configuration data broadcasted by the main control device in response to the network configuration data request.

The network configuration module 43 may be configured to perform the network configuration according to the network configuration data and broadcast the first indication information, where the first indication information may be configured to indicate that the network configuration is completed.

In an optional implementation manner, the first broadcast module 41 may be configured to configure the device name according to the serial number identification of the network configuration data to-be-requested.

In an optional implementation manner, the first monitoring module 42 may be configured to monitor the network configuration data packet broadcasted by the main control device in response to the device name discovered by search, where the network configuration data packet may include the network configuration data.

In an optional implementation manner, above-mentioned apparatus may further include a first check module 44, configured to perform data check on the network configuration data included in the network configuration data packet and determine that the network configuration data is received correctly; and/or above-mentioned apparatus may further include a first determination module 45, configured to determine that complete network configuration data has been received according to the size of the network configuration data packet.

In an optional implementation manner, the first check module 44 may be configured to calculate the check value of the network configuration data using a cyclic redundancy check rule; and if the check value is consistent with the check information included in the network configuration data packet, determine that the network configuration data is received correctly; or may be configured to compare the network configuration data included in the network configuration data packets monitored by all broadcast channels; and if the network configuration data monitored by all broadcast channels are consistent with each other, determine that the network configuration data is received correctly.

In an optional implementation manner, the first check module 44 may be also configured to determine that the network configuration data is received incorrectly if the check value is not consistent with the check information included in the network configuration data packet, or if the network configuration data monitored by all broadcast channels are not consistent with each other, determine that the network configuration data is received incorrectly; after the first check module 44 determines that the network configuration data is received incorrectly, the first broadcast module 41 may be also configured to keep current device name; and the first monitoring module 42 may be also configured to monitor the network configuration data packet re-broadcasted by the main control device in response to the device name discovered by search.

In an optional implementation manner, the first determination module 45 may be also configured to determine that complete network configuration data has been received if the data volume of the network configuration data packet is less than the preset transmission threshold.

In an optional implementation manner, the first determination module 45 may be also configured to determine that complete network configuration data has not been received if the data volume of the network configuration data packet is equal to the preset transmission threshold; after the first determination module 45 determines that complete network configuration data has not been received, the first broadcast module 41 may be also configured to configure the device name according to the serial number identification of next network configuration data; and the first broadcast module

41 may be also configured to monitor next network configuration data packet broadcasted by the main control device.

Figure 5:
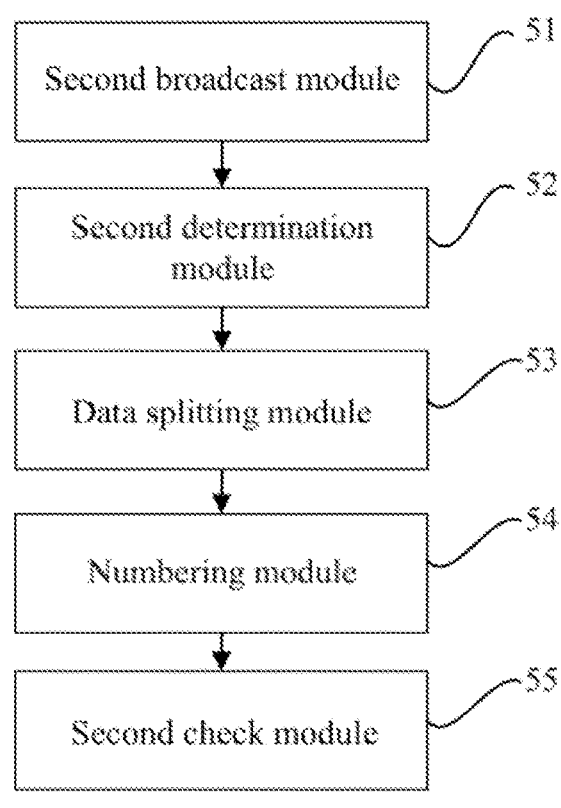
FIG. 5 illustrates another structural schematic of a network configuration apparatus according to exemplary embodiments of the present disclosure.

FIG. 5 illustrates another structural schematic of a network configuration apparatus according to exemplary embodiments of the present disclosure. Referring to FIG. 5, above network configuration apparatus may include a second broadcast module 51 and a second determination module 52.

The second broadcast module 51 may be configured to broadcast the network configuration data in response to monitored network configuration data request.

The second determination module 52 may be configured to determine that the network configuration of the image-forming device is completed in response to monitored first indication information.

In an optional implementation manner, the second broadcast module 51 may be configured to, in response to the device name of discovered image-forming device by search, determine the serial number identification of the network configuration data to-be-requested; and broadcast corresponding network configuration data packet according to the serial number of the network configuration data, where the network configuration data packet may include the network configuration data.

In an optional implementation manner, above apparatus may further include a data splitting module 53, configured to split complete network configuration data according to the preset transmission threshold to obtain at least one piece of network configuration data; and include a numbering module 54, configured to assign a corresponding serial number identification to at least one piece of network configuration data according to the preset numbering rule.

In an optional implementation manner, above apparatus may further include a second check module 55, configured to check the network configuration data using a cyclic redundancy check rule to obtain check information.

In an optional implementation manner, the second broadcast module 51 may be also configured to re-search the device name of the image-forming device; if the device name discovered by re-search is still the serial number identification of the network configuration data, re-broadcast the network configuration data packet; and if the device name discovered by re-search is the serial number identification of next network configuration data, broadcast next network configuration data packet.

In an optional implementation manner, the second determination module 52 may be configured to determine the first indication information in response to the device name of the image-forming device discovered by search and determine that the image-forming device network configuration is completed according to the first indication information.

Figure 6:
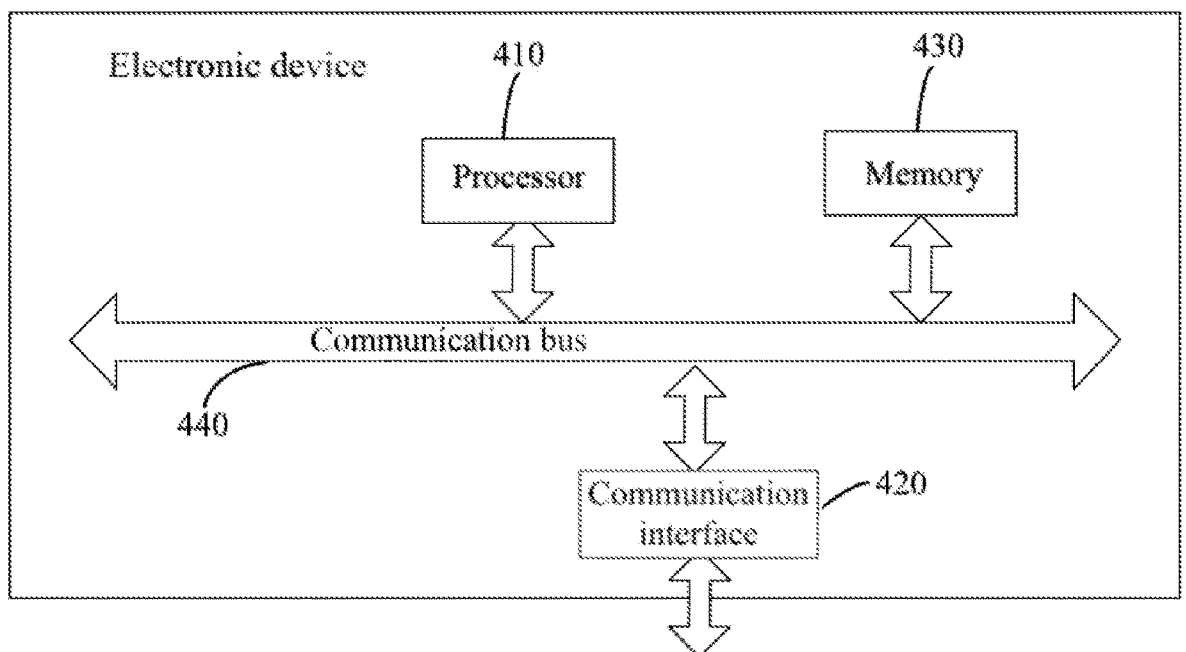
FIG. 6 illustrates a structural schematic of an electronic device according to exemplary embodiments of the present disclosure.

FIG. 6 illustrates a structural schematic of an electronic device according to exemplary embodiments of the present disclosure. Referring to FIG. 6, the electronic device may include at least one processor; and at least one memory communicated with above-mentioned processor. The memory may store program instructions executable by the processor, and above-mentioned processor may call above-mentioned program instructions to execute the network configuration method provided by embodiments of the present disclosure.

FIG. 6 shows a block diagram of an exemplary electronic device suitable for implementing embodiments of the present disclosure. The electronic device shown in FIG. 6 may be only an example and should not limit the function and usage scope of embodiments of the present disclosure.

As shown in FIG. 6, the electronic device may be embodied as a general-purpose computing device. The components of the electronic device may include, but may not be limited to, one or more processors 410, a memory 430, and a communication bus 440 configured to connect different system components (including the memory 430 and the processors 410) with each other.

The communication bus 440 may represent one or more of multiple types of bus structures, including a memory bus or memory controller, a peripheral bus, an accelerated graphics port, a processor, or a local bus using any of various bus structures. For example, these architectures may include, but may not be limited to, an industry standard architecture (ISA) bus, a micro channel architecture (MAC) bus, an enhanced ISA bus, a video electronics standards association (VESA) local bus and a peripheral component interconnection (PCI) bus.

The electronic devices may include a variety of computer system readable media. These media may be any available media that can be accessed by the electronic device, and may include both volatile and nonvolatile media, and removable and non-removable media.

The memory 430 may include a computer system-readable medium in the form of a volatile memory, such as a random access memory (RAM) and/or a cache memory. The electronic device may further include other removable/non-removable, volatile/nonvolatile computer system storage media. Although not shown in FIG. 6, a disk driver for reading and writing a removable non-volatile magnetic disk (such as a "floppy disk") may be provided; and an optical disk driver for reading and writing a removable non-volatile optical disk (such as a compact disk ROM (CD-ROM), a digital video disc ROM (DVD-ROM) or other optical media) may also be provided. In such cases, each driver may be connected to the communication bus 440 through one or more data media interfaces. The memory 430 may include at least one program product, which may contain a set of (for example, at least one) program modules configured to execute the function of various embodiments of the present disclosure.

A program/utility tool having a set (at least one) of program modules may be stored in the memory 430. Such program modules may include, but may not be limited to, an operating system, one or more application programs, other program modules, and program data. Each or certain combination in disclosed embodiments may include network environment implementation. The program modules may perform the functions and/or methods in embodiments described herein.

The electronic device may also communicate with one or more external devices (such as a keyboard, pointing device, display and the like), and may also communicate with one or more devices that enable a user to interact with the electronic device; and/or communicate with any device (such as a network card, a modem and the like) that enables the electronic device to communicate with one or more other computing devices. Such communication may be performed through a communication interface 420. Moreover, the electronic device may also communicate with one or more networks (such as a local area network (LAN), a wide area network (WAN) and/or or a public network including the Internet). Above-mentioned network adapter may communicate with other modules of the electronic device through the communication bus 440. It should be understood that although not shown in FIG. 6, other hardware and/or software modules used in conjunction with the electronic device may include, but may not be limited to, microcode, device drivers, redundant processing units, external disk drive arrays, disk arrays (redundant arrays of independent drives RAID) systems, tape drivers, data backup storage systems and the like.

The processor 410 may execute various functional diss and network configuration by running the programs stored in the memory 430, for example, implement the network configuration method provided in embodiments of the present disclosure.

Embodiments of the present disclosure further provides a computer-readable storage medium, where the computer-readable storage medium may store computer instructions, and the computer instructions may cause the computer to execute the network configuration method provided in embodiments of the present disclosure.

Any combination of one or more computer-readable storage media may be used for above-mentioned computer-readable storage medium. The computer-readable medium may be a computer-readable signal medium or a computer-readable storage medium. The computer-readable storage medium may be, for example, but may not be limited to, an electrical, magnetic, optical, electromagnetic, infrared, or semiconductor system, apparatus or device, or any combination thereof. More examples (non-exhaustive list) of the computer-readable storage media may include electrical connections with one or more conductors, portable computer disks, hard disks, random access memory (RAM), read only memory (ROM), erasable programmable read-only memory (EPROM) or flash memory, optical fibers, portable compact disk read-only memory (CD-ROM), optical storage devices, magnetic memory components, or any suitable combinations thereof. In the present disclosure, the computer-readable storage medium may be any tangible medium that includes or stores programs that may be used by or in conjunction with an instruction execution system, apparatus, or device.

The computer-readable signal medium may include data signals, carrying computer-readable program code, transmitted in a baseband or used as a part of a carrier wave. Such transmitted data signals may take various forms, which may include, but may not be limited to, electromagnetic signals, optical signals, or any suitable combinations thereof. The computer-readable signal medium may also be any computer-readable medium other than the computer-readable storage medium. The computer-readable medium may send, transmit or transport the programs for use by or in combined with the instruction execution system, apparatus or device.

Program code included on the computer-readable medium may be transmitted using any suitable medium, which may include, but may not be limited to, wireless, wireline, optical fiber cable, RF, or any suitable combination thereof.

From above-mentioned embodiments, it may be seen that the solutions provided in the present disclosure may achieve at least following beneficial effects.

In above-mentioned technical solutions, firstly, the image-forming device may broadcast the network configuration data request, and the main control device may broadcast the network configuration data in response to monitored network configuration data request. Next, after the image-forming device monitors the network configuration data broadcasted by the main control device, the image-forming device may perform the network configuration according to the network configuration data and broadcast the first indication information. Finally, the main control device may determine that the network configuration of the image-forming device is completed in response to monitored first indication information. Through above technical solutions, the main control device may obtain the network configuration progress of the image-forming device in time, which may improve the reliability of the network configuration process; and the image-forming device may actively control sending time of network configuration information, which may improve the flexibility of the network configuration process.

In the description of the present disclosure, descriptions referring to the terms including "one embodiment", "some embodiments", "example", "specific examples", or "some examples" may indicate that specific features, structures, materials or characteristics, which are described in combination with embodiments or examples, may be included in at least one embodiment or example of the present disclosure. In the present disclosure, the exemplary description of above terms may not be necessarily directed to a same embodiment or example. Furthermore, described specific features, structures, materials or characteristics may be combined in any suitable manner in any one or more embodiments or examples. In addition, those skilled in the art may combine and integrate different embodiments or examples, and features of different embodiments or examples described in the present disclosure without conflicting with each other.

In addition, the terms "first" and "second" may be used for descriptive purposes only and cannot be interpreted as indicating or implying relative importance or implicitly specifying the quantity of indicated technical features. Thus, the features defined as "first" and "second" may explicitly or implicitly include at least one of such features. In the description of the present disclosure, "plurality" may indicate at least two, such as two, three or the like, unless otherwise specifically defined.

Any process or method description in the flow charts or otherwise described herein may be understood to represent a module, segment or portion of code of executable instructions of one or more steps for implementing a custom logical function or process. Furthermore, the scope of optional embodiments of the present disclosure may include additional implementations. Functions may be performed out of the order shown or discussed, including substantially concurrently or in reverse order depending upon the functions involved, which should be understood by those skilled in the art according to embodiments of the present disclosure.

It should be noted that the terminals in embodiments of the present disclosure may include, but may not be limited to, printers, personal computers (PC), personal digital assistants (PDA), wireless handheld devices, tablet computers, mobile phones, MP3 players, MP4 players and the like.

In some embodiments provided in the present disclosure, it should be understood that disclosed systems, apparatuses and methods may be implemented in other manners. For example, apparatus embodiments described above may be only illustrative. For example, the division of the units may be only a logical function division, and there may be other division methods in actual implementation. For example, multiple units or components may be combined or may be integrated into another system, or some features may be omitted or may not be implemented. In addition, mutual coupling or direct coupling or communication connection shown or discussed may be through some interfaces, and indirect coupling or communication connection of apparatuses or units may be in electrical, mechanical or other forms.

Furthermore, each functional unit in each embodiment of the present disclosure may be integrated into one processing unit, each unit may be separately from each other physically, or two or more units may be integrated into one unit. Above-mentioned integrated units may be implemented in the form of hardware, or in the form of hardware plus software functional units.

Above description may merely be optional embodiments of the present disclosure and may not be intended to limit the present disclosure. Any modifications, equivalent replacements, improvements and the like made within the spirit and principles of the present disclosure shall be included within the protection scope of the present disclosure.

What is claimed is:

1. A network configuration method, applied to an image-forming device, comprising:

broadcasting a network configuration data request;

monitoring network configuration data broadcasted by a main control device in response to the network configuration data request, including:

monitoring a network configuration data packet broadcasted by the main control device, wherein the network configuration data packet includes the network configuration data; and determining that complete network configuration data has been received in response to determining that a data volume of the network configuration data packet is less than a preset transmission threshold; and performing network configuration according to the network configuration data and broadcasting first indication information, wherein the first indication information is configured to indicate the network configuration is completed.

2. The method according to claim 1, wherein broadcasting the network configuration data request includes:

associating a device name of the image-forming device with the network configuration data request.

3. The method according to claim 2, wherein monitoring the network configuration data broadcasted by the main control device in response to the network configuration data request includes:

monitoring the network configuration data packet broadcasted by the main control device in response to a search by the main control device according to the device name of the image-forming device.

4. The method according to claim 1, further including:

performing data check on the network configuration data included in the network configuration data packet to determine that the network configuration data is received correctly.

5. The method according to claim 4, wherein the network configuration data packet further includes check information; and performing the data check on the network configuration data included in the network configuration data packet to determine that the network configuration data is received correctly includes:

calculating a check value of the network configuration data using a cyclic redundancy check rule; and if the check value is consistent with the check information included in the network configuration data packet, determining that the network configuration data is received correctly; or if the check value is not consistent with the check information included in the network configuration data packet, determining that the network configuration data is received incorrectly.

6. The method according to claim 1, further including:

comparing the network configuration data included in network configuration data packets monitored by all broadcast channels; and if the network configuration data monitored by all broadcast channels are consistent with each other, determining that the network configuration data is received correctly; or if the network configuration data monitored by all broadcast channels are not consistent with each other, determining that the network configuration data is received incorrectly.

7. The method according to claim 6, after determining that the network configuration data is received incorrectly, further including:

keeping current device name; and monitoring a network configuration data packet re-broadcasted by the main control device.

8. The method according to claim 1, further including:

if the data volume of the network configuration data packet is equal to the preset transmission threshold, determining that the complete network configuration data has not been received.

9. The method according to claim 1, wherein broadcasting the first indication information includes:

configuring a device name of the image-forming device according to the first indication information.

10. The method according to claim 1, further including:

determining whether the network configuration data packet includes a preset identification;

if the network configuration data packet includes the preset identification, determining that complete network configuration data has been received.

11. A network configuration method, applied to a main control device, comprising:

in response to a network configuration data request received from an image-forming device, broadcasting network configuration data, including:

broadcasting a network configuration data packet to the image-forming device, wherein the network configuration data packet includes the network configuration data; and determining that complete network configuration data has been transmitted to the image-forming device in response to determining that a data volume of the network configuration data packet is less than a preset transmission threshold; and in response to first indication information received from the image-forming device, determining that network configuration of the image-forming device is completed.

12. The method according to claim 11, wherein broadcasting the network configuration data includes: determining serial number identification of the network configuration data; and broadcasting the network configuration data packet according to the serial number identification of the network configuration data.

13. The method according to claim 11, further including:

prior to broadcasting the network configuration data, splitting the network configuration data according to a preset transmission threshold to obtain at least one piece of the network configuration data; and according to a preset numbering rule, respectively assigning corresponding serial number identification to the at least one piece of the network configuration data.

14. The method according to claim 11, wherein:

the network configuration data packet further includes check information; and the check information is obtained by checking the network configuration data using a cyclic redundancy check rule.

15. The method according to claim 13, further including:

re-searching a device name of the image-forming device; and if the device name discovered by re-search is still the serial number identification of the network configuration data, re-broadcasting the network configuration data packet; or if the device name discovered by re-search is serial number identification of next network configuration data, broadcasting a next network configuration data packet.

16. The method according to claim 11, wherein determining that the network configuration of the image-forming device is completed includes:

determining the first indication information corresponds to the image-forming device in response to a search by a device name of the image-forming device; and determining that the network configuration of the image-forming device is completed according to the first indication information.

17. The method according to claim 11, further including:

adding a network configuration service identification to a packet header of the network configuration data packet.

18. A non-transitory computer-readable storage medium including computer instructions which, when being executed, causes a image-forming device to execute a network configuration method, the method comprising:

broadcasting a network configuration data request;

monitoring network configuration data broadcasted by a main control device in response to the network configuration data request, including:

monitoring a network configuration data packet broadcasted by the main control device, wherein the network configuration data packet includes the network configuration data; and determining that complete network configuration data has been received in response to determining that a data volume of the network configuration data packet is less than a preset transmission threshold; and performing network configuration according to the network configuration data and broadcasting first indication information, wherein the first indication information is configured to indicate the network configuration is completed.

19. The storage medium according to claim 18, wherein broadcasting the network configuration data request includes:

associating a device name of the image-forming device with the network configuration data request.

20. The storage medium according to claim 19, wherein monitoring the network configuration data broadcasted by the main control device in response to the network configuration data request includes:

monitoring the network configuration data packet broadcasted by the main control device in response to a search by the main control device according to the device name of the image-forming device.

* * * * *